G. BRODSKY.
APPARATUS FOR SIGNALING BY MEANS OF LIGHT.
APPLICATION FILED MAY 22, 1917.
1,291,636.
Patented Jan. 14, 1919.
3 SHEETS—SHEET 1.
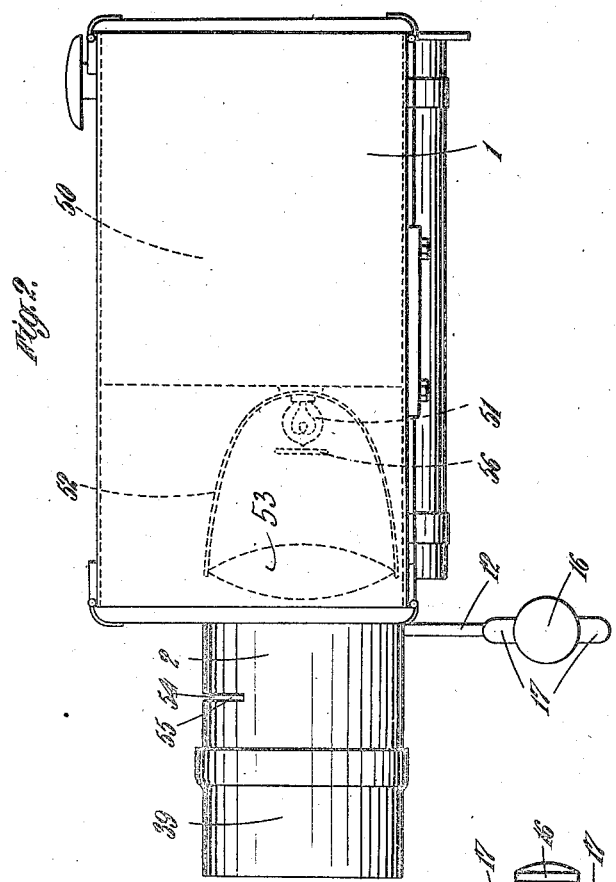
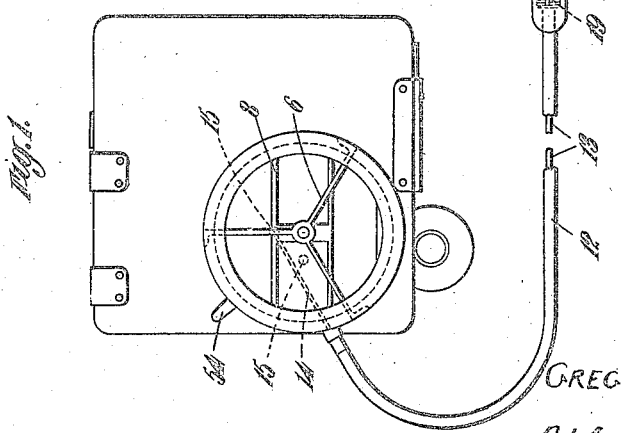
GREGORY BRODSKY.

G. BRODSKY.
APPARATUS FOR SIGNALING BY MEANS OF LIGHT.
APPLICATION FILED MAY 22, 1917.
1,291,636.
Patented Jan. 14, 1919.
3 SHEETS—SHEET 2.
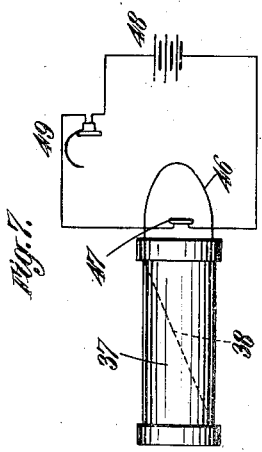
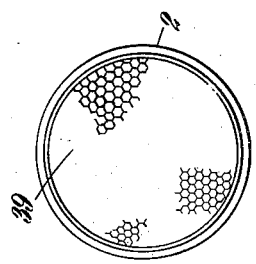
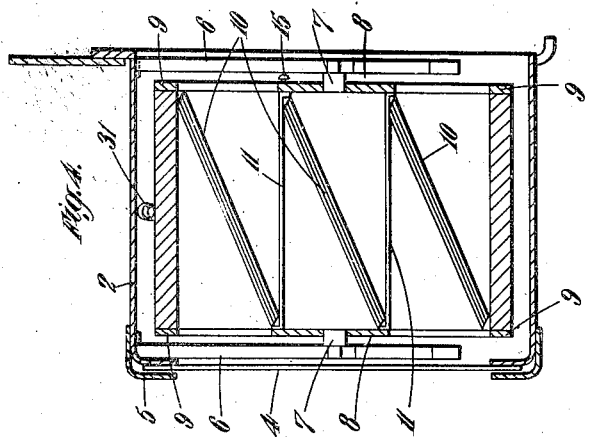
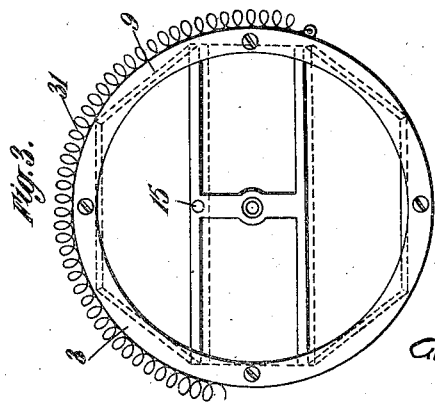
GREGORY BRODSKY.
INVENTOR
By Lawrence Langner
Attorney

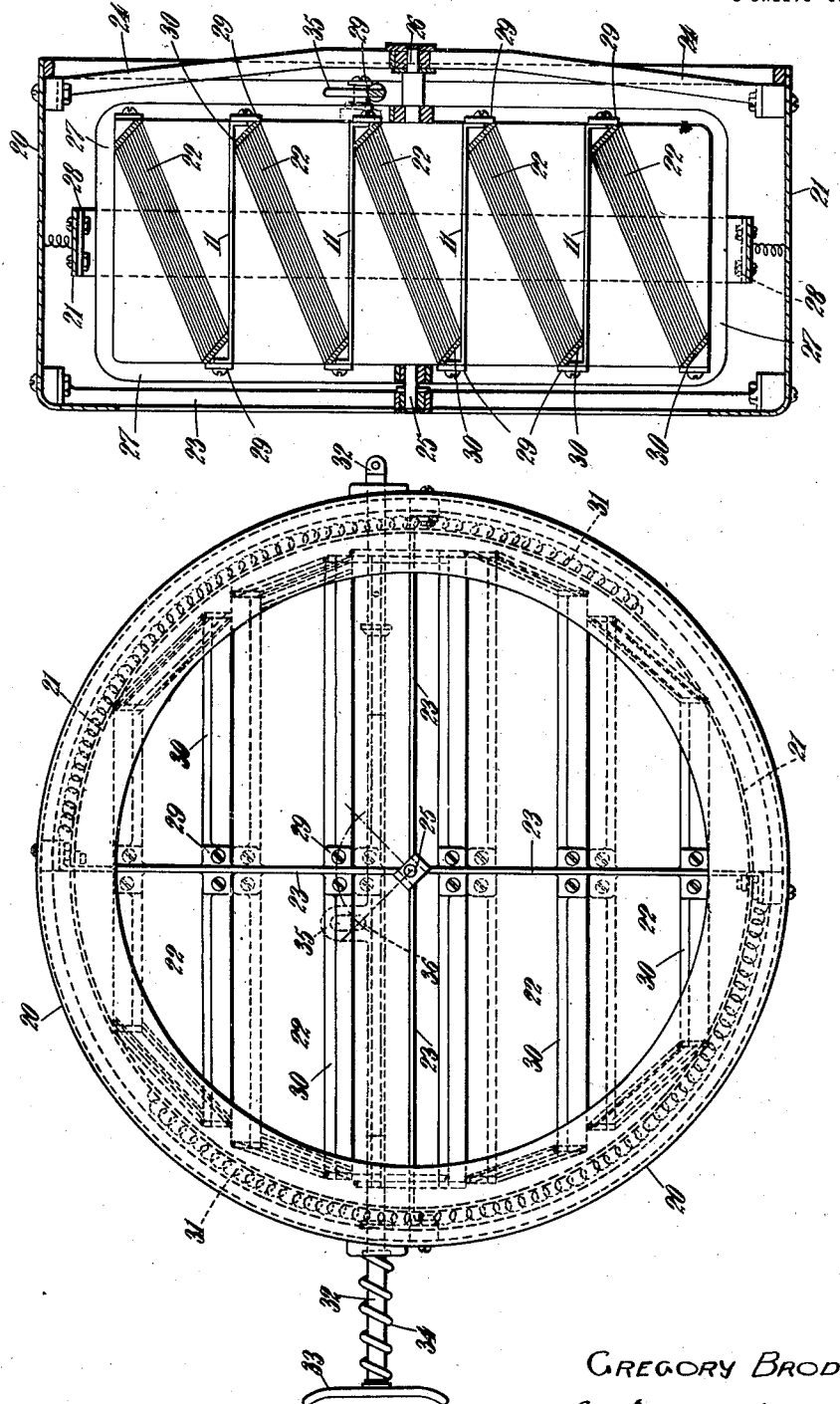

UNITED STATES PATENT OFFICE.

GREGORY BRODSKY, OF LONDON, ENGLAND.

APPARATUS FOR SIGNALING BY MEANS OF LIGHT.

1,291,636.  Specification of Letters Patent.  Patented Jan. 14, 1919.

Application filed May 22, 1917. Serial No. 170,189.

*To all whom it may concern:*

Be it known that I, GREGORY BRODSKY, a subject of the King of Great Britain, and residing at Bailey's Hotel, Gloucester Road, London, England, have invented certain new and useful Improvements Relating to Apparatus for Signaling by Means of Light, of which the following is a specification.

This invention relates to apparatus for the transmission and reception of signals by means of a polarized light. It is the principal object of the invention to provide an improved form of polarizer which will transmit a beam of light of great intensity and of any required dimensions. This object is attained by the use of a revoluble polarizer carrying a number of piles or sets of thin glass plates situated at an angle to the direction of the beam of light to be transmitted, the signals being given by turning the polarizer, while they are detected by a polarized receiving instrument. Further objects are to provide efficient means for supporting and holding the sets of glass plates in a barrel which can be conveniently turned, and to provide improved means for the reception of such signals whereby the action of light falling on a light-sensitive (selenium) cell will cause electric currents to pass, these being utilized to enable the signals to be detected by sound or otherwise.

These and other objects are attained by the apparatus forming the subject of the invention, and which will now be described with reference to the accompanying drawings which illustrate suitable embodiments thereof. In the drawings: Figure 1 is a front elevation, and Fig. 2 a side elevation, showing an electric signaling lamp casing with a polarizer applied thereto. Fig. 3 is a front view, and Fig. 4 a vertical section of the polarizing barrel, drawn to a larger scale. Fig. 5 is a front elevation, and Fig. 6 a vertical section showing a larger type of polarizing fitting. Fig. 7 is a diagram of a particular detecting arrangement. Fig. 8 is a detail view in front elevation of a device for restricting the passage of divergent rays of light.

Referring first to Figs. 1 and 2, the casing 1 there shown may contain an electric battery 50, an electric lamp 51, and preferably also a parabolic reflector 52, a projecting lens 53, or any equivalent means adapted to provide a parallel beam of light, as is usual in signaling lamps. In place however, of the usual shutter with louver plates, the opening of the casing has fitted in it a metal cylinder 2 in which turns a barrel 3, Figs. 3 and 4, carrying polarizing means. The front of the cylinder 2 is closed by a glass plate 4, secured by a cap 5. The barrel 3 is supported in the cylinder by means of a pair of three-armed spiders 6, at back and front, secured at their ends by screws in the cylinder, while forming bearings at their centers for bearing pins 7. The pins 7 project from transverse frame members 8 which form part of annular end pieces 9 secured to the barrel 3 at each end. The barrel carries three piles 10 of very thin glass plates, say twelve plates in each pile, the two outer piles being of plates wider at one end than the other, while the plates of the middle pile may be rectangular as seen in Fig. 3. The barrel is slotted to receive the three piles of plates 10 at the proper angle. This angle varies considerably according to the physical conditions such as the refractive index of the glass, the number and thickness of the glass plates, the quality of their surfaces and so forth; the angle must therefore be determined by experiment in each case. In the instruments made according to the illustrations, the suitable angle was found to be about 23° to the axis of the beam of light, but it might be several degrees more or less than this under altered physical conditions. The lines 11 in Fig. 4 represent thin metal plates which must be inserted in order to avoid the transmission of reflected light between the piles of glass plates, which light would be polarized in a plane at right angles to that of the refracted light. A coiled spring 31 or the like may be arranged tending to pull the polarizer into one position, while it is turned against the action of the spring through 90° for signaling purposes by any suitable device. An arm 54 projecting from barrel 3 through a slot 55 in the cylinder 2 would serve the purpose, but it is often preferable to use a flexible operating mechanism similar to a photographic shutter release device. This is illustrated in Figs. 1 and 2 wherein 12 is the flexible but incompressible sheath, and 13 the wire passing therethrough, connected at its inner end to a rod 14 which engages with a pin at 15 on the frame 8. The rod is operated by pressing inwardly the wire 13 by means of the head piece 16 which slides in a sleeve 18, this latter being provided with finger pieces 17 by which it can be held while the head 16 is pressed inwardly by the palm of the hand. In the position shown the head has been pressed inwardly against the action of its spring 19, the polarizer being turned to the position shown in which the front edges of its piles of plates are horizontal. The release of the head 16 would allow the polarizer to turn through 90° as indicated by the dotted position of the pin 15 in Fig. 1.

In order to limit the angle of divergence of the beam of light issuing from the apparatus, I may interpose in the path of the beam a honeycombed frame 39, indicated in side view in Fig. 2, and in face view in Fig. 8, said frame having a large number of parallel hexagonal tubes through which the light passes, the length of these tubes being such as to limit the possible divergence to the required angle.

The modification of the apparatus shown in Figs. 5 and 6 is identical in principle with that shown in Figs. 1 to 4, but it is designed to be made on a larger scale, and may be combined for instance with a small searchlight for projecting a beam of light visible to a great distance. The fixed outer casing 20 carries an inner revoluble barrel or ring 21 in which five piles 22 of glass plates are inserted. The barrel 21 is supported in this case by four-armed spiders 23 and 24 at the front and back respectively, provided at their centers with bearings for the pivot pins 25 and 26 of the barrel. These pivot pins are carried on a rectangular frame 27 secured by lugs 28 at top and bottom to the barrel 21, and formed in the diametral portions with lugs 29 which are screwed to the end pieces of frames 30 which are employed in this case for holding the piles of plates. The frames 30 have been shown considerably wider in Figs. 5 and 6 than they need be made, so that the construction may be clear. In practice the piles of plates and their carrying frames 30 can be about half the depth shown, so that the light is subject to less obstruction. In any case the cross bars formed by the front members of the frame are found to be invisible by an observer at any distance away such as might occur in practice with an instrument of this type. Springs 31 tend to hold the barrel in one position, and it is turned through 90° by a sliding rod 32 operated by a pusher 33 against the action of a spring 34, the said rod being carried across the casing a little above the center line at the back of the barrel, and being provided with a slotted lug 35, in the slot of which a pin 36 works. This pin is secured on a lug projecting from the frame member 27 at the back of the barrel. The springs 31 are not necessarily employed as the spring 34 may be made sufficiently strong to pull back the barrel when released. The dotted lines radiating from the center 25 in Fig. 5 indicate the angle of movement, this being from 45° to the left of the vertical to 45° to the right of the vertical for the radial line on which the pin 36 lies.

The receiving instrument for reading the signals may be of a known type consisting essentially of an analyzer through which the signals will be seen either as flashes from dark to light, intermissions from light to dark, or variations in intensity of the light according to the relation between the planes of polarization of the transmitting and receiving instruments. The analyzer may be combined with a telescope, binoculars, or any other optical instruments for facilitating the observation of signals from a distance, but for some purposes the analyzer used alone will suffice. The preferred arrangement is that in which a telescope is used with a suitable analyzing prism which will allow of the transmission of light waves in one plane only, such for instance as an improved Nichol prism made up with Iceland spar and glass. The prism should be placed in front of the eye-piece lens, in order to secure good definition of vision while using a small prism. The analyzer at the receiving point can readily be turned by hand until the most distinctive results are obtained, but however it is placed the signals can be read, as when the transmitting polarizer is turned through 90° the light is bound to pass through a condition in which its plane of polarization is at right angles to that of the receiving instrument. A prism made up of a pile of glass plates may be used also as the analyzer, but is not so satisfactory for this purpose as a Nichol prism, on account of the difficulty of securing good definition.

An observer without an instrument having an analyzer will be unable to detect any change in the light as the barrel of the transmitting instrument is turned, because the turning of the plane of polarization of a beam of light cannot be detected by the human eye. An observer, however, having an instrument with an analyzer needs only to sight it upon the spot of light at the transmitting station, and to turn it until the changes of intensity of light are most easily detected, whereupon he can watch and read the signals without any further difficulty or adjustment.

If it is desired for any reason to use colored light for the signals, this can be done without altering the nature of the light seen by the naked eye if a filter of mica, quartz or other doubly-refracting crystal (56, Fig. 2) is provided in the path of the beam of light in the signaling instrument, so that the rays will be colored in one sense in the plane of polarization. The complementary color would then appear on turning the plane of polarization through 90°, and the signals would be read by the changes of color. If, for instance, the transmitter showed red to the observer with the polarizing barrel in one position, the spot of light would become green when the barrel was turned through 90° for giving a signal.

Instead of an electric lamp as the source of light, any other suitable source of illumination might be used. The pile of plates may be divided up into any required number of sections placed one above another, and the three sections in Figs. 1 to 4 or five sections in Figs. 5 and 6, have been indicated only by way of example.

When the polarizing instrument transmits a beam of light of sufficient intensity, it is possible to transform the visible indications into audible indications by using with the analyser an instrument sensitive to light and adapted to be acted upon by the polarized light, so as to vary the resistance in an electric circuit. In Fig. 7 for example the casing 37 contains an analyzer 38 formed of a pile of glass plates; 46 is a parabolic mirror condensing the beam of light passing through the analyser upon a selenium cell 47 disposed at the focus of the parabola. Any other convenient means might be used instead of the mirror for condensing the light upon the selenium cell. The cell is in the circuit of a battery 48 and a telephone 49, the variations in the current allowed to pass by the selenium cell 47 being heard as ticking noises in the telephone 49. In place of a telephone of course any other desired form of detecting or reading instrument operable by electric current might be used. These and other like modifications will be obvious without further explanation.

Having thus described my invention what I claim as new and desire to secure by Letters Patent is:—

1. In an apparatus for signaling by means of polarized light, the combination of a source of light adapted to give an approximately parallel beam, a revoluble member with means for supporting the same and means for turning it through a partial revolution, a pile of thin plates of a translucent refracting medium and frame members supporting said pile of plates in the revoluble member aforesaid, at an angle to the axis of revolution such that a beam of light passing through said pile of plates will be polarized by refraction therethrough.

2. In an apparatus for signaling by means of polarized light, the combination of a source of light adapted to give an approximately parallel beam, a revoluble member with means for supporting the same and means for turning it through a partial revolution, a plurality of piles of thin plates of a translucent refracting medium and frame members for supporting said piles of plates one beside another in positions extending across the revoluble member as chords thereof, each pile of plates being set at such an angle to the axis of the revoluble member that the beam of light passing therethrough will be polarized by refraction.

3. In an apparatus for signaling by means of polarized light, the combination of a source of light adapted to give an approximately parallel beam, a revoluble member with means for supporting the same and means for turning it through a partial revolution, a plurality of piles of thin plates of a translucent refracting medium and frame members for supporting said piles of plates one beside another in positions extending across the revoluble member as chords thereof, each pile of plates being set at such an angle to the axis of the revoluble member that the beam of light passing therethrough will be polarized by refraction, and thin plates of opaque material disposed as chords transversely of the revoluble frame between each pile of translucent plates and the next thereof, said opaque plates being disposed in planes parallel to a plane through the axis of the revoluble member, whereby the transmission of reflected polarized light is substantially prevented.

4. In an apparatus for signaling a polarizer for use with a source of light, the combination of a revoluble frame with means for supporting the same and means for turning it through a partial revolution, a plurality of cells arranged transversely of such revoluble member as chords thereof, a plurality of piles of thin parallel glass plates, one pile supported in each said cell and at an angle to the axis of the revoluble member such that a beam of light passing therethrough is polarized by refraction and means for preventing the transmission of reflected polarized light from the surfaces of said piles of glass plates.

5. In an apparatus for signaling by means of polarized light, the combination of a source of light adapted to give an approximately parallel beam, a revoluble member with means for supporting the same and means for turning it through a partial revolution, a pile of thin plates of a translucent refracting medium and frame members supporting said pile of plates in the revoluble member aforesaid, at an angle to the axis of revolution such that a beam of light passing through said pile of plates will be polarized by refraction therethrough, and a filter of doubly-refracting crystal situated in the path of the beam of light whereby the rays will be colored in one sense in one plane of polarization and in a complementary sense in a plane of polarization at right-angles to the first.

GREGORY BRODSKY.